United States Patent [19]

Jones

[11] Patent Number: 4,715,963

[45] Date of Patent: Dec. 29, 1987

[54] METHOD OF DEWATERING FOOD ITEMS

[76] Inventor: Darlene N. Jones, 842 William, River Forest, Ill. 60305

[21] Appl. No.: 32,177

[22] Filed: Mar. 30, 1987

Related U.S. Application Data

[62] Division of Ser. No. 798,925, Nov. 18, 1985, abandoned.

[51] Int. Cl.$^4$ ............................................ B01D 17/038
[52] U.S. Cl. ..................... 210/781; 426/112; 426/478; 426/495
[58] Field of Search ............... 210/770, 781, 787, 248, 210/464, 465, 470, 512.1, 782, 360.1; 426/489, 495, 478, 112; 249/83; 222/83.5; 99/496, 501; 383/7, 38, 39, 40, 906; 206/554; 220/205, DIG. 14, DIG. 29

[56] References Cited

U.S. PATENT DOCUMENTS

| | | | |
|---|---|---|---|
| 2,800,269 | 7/1957 | Smith | 383/38 |
| 2,828,858 | 4/1958 | Tooke | 383/38 |
| 3,159,096 | 12/1964 | Tacker | 99/485 |
| 3,542,032 | 11/1970 | Spencer | 383/38 |
| 3,543,999 | 12/1970 | Kugler | 383/38 |
| 4,388,739 | 6/1983 | Martiron et al. | 383/38 |
| 4,540,089 | 9/1985 | Maloney | 383/38 |

*Primary Examiner*—Richard V. Fisher
*Assistant Examiner*—Wanda L. Millard
*Attorney, Agent, or Firm*—Fitch, Even, Tabin & Flannery

[57] ABSTRACT

A method of dewatering food items, such as salad greens. The method comprises the steps of placing the food items in a compartment formed of flexible thinwall sheet material, said compartment having an open top and an opening opposite the open top sized to permit passage of liquid but substantially to prevent passage of food items therethrough. The compartment is twirled by its open top to cause water from the food items to be expelled through the opening by centrifugal force.

2 Claims, 4 Drawing Figures

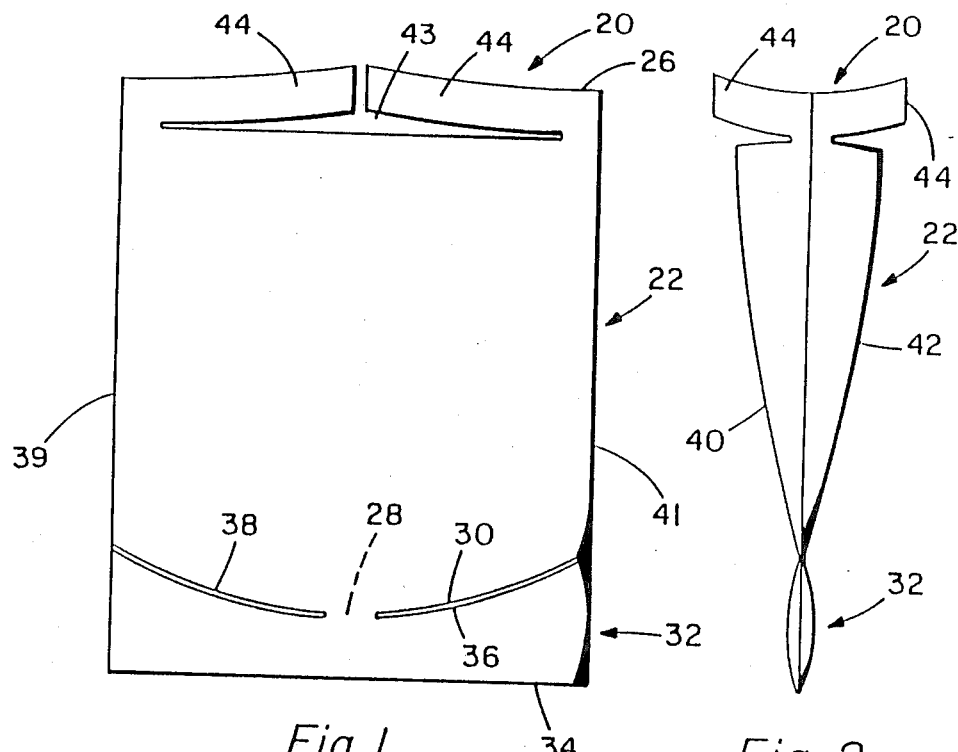
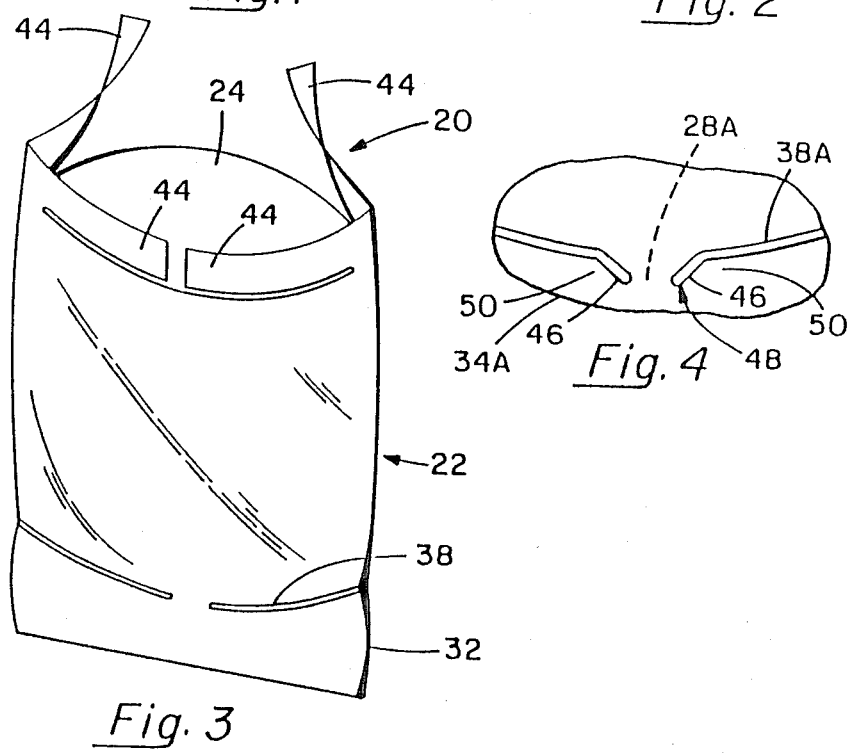

METHOD OF DEWATERING FOOD ITEMS

This application is a division of Application Ser. No. 798,925, filed Nov. 18, 1985, now abandoned.

The subject invention relates to methods for food preparation and, more particularly, to a method of removing surface water from food items.

BACKGROUND OF THE INVENTION

Many food items, such as salad greens, are commonly prepared by washing them under a faucet and draining them using a perforated bowl such as a colander. Many vegetables, due to the size and curvature of their leaves, provide pockets which collect water. Such pockets, as well as the adhesion of water drops to the surfaces of leaves and stems, prevent or slow draining of water from the greens. Rapid shaking of the colander is not satisfactory as it tends to broadcast water in all directions. Additionally, some greens may fall from the colander and require rewashing. Placing the washed food items on absorbent paper or cloth is one solution, but is time-consuming and requires substantial counter space and absorbent material.

To overcome these difficulties, various washer/dewaterers for food items have been proposed. These devices typically include a rotatable perforated inner bowl for receiving the food items, an outer bowl rotatably holding the inner bowl, a top having an opening for receiving water, and a mechanism for spinning the inner bowl. It will be appreciated that such devices are relatively expensive, take up a large amount of storage space and require cleaning and drying after each use.

SUMMARY OF THE INVENTION

Among the several aspects and features of the present invention may be noted the provision of an improved dewaterer for food items. The dewatering device is extremely light in weight and requires a minimum of storage space. The device is formed entirely of thinwall sheet material, such as plastic, and dewatering is effected by revolving the device, usually manually, thereby causing centrifugal force to remove water from the food items. The dewaterer functions to collect the water removed from the food items and to substantially prevent the water from returning to the food items. The device is reliable in use, can be economically manufactured, and its cost is sufficiently low that it can be discarded after use. Other aspects and features of the present invention will be in part apparent and in part pointed out hereinafter in the following specification and accompanying drawings.

Briefly, the dewatering device of the present invention comprises a bag formed of thinwall sheet material divided into a first compartment and a second compartment. The first compartment is adapted to receive washed food items, and has a throat adjacent its bottom sized to permit passage of water therethrough but substantially to prevent passage of the food items therethrough. The second compartment is in fluid communication with the first compartment through the throat, and functions to collect water therein. By twirling or otherwise revolving the bag, surface water on food items in the first compartment is centrifugally forced off the surface of the food items and through the throat into the second compartment, where it is collected and retained to subsequently be discarded.

BRIEF DESCRIPTION OF THE DRAWINGS

FIG. 1 is a front elevational view of the dewatering device of the present invention;

FIG. 2 is a side elevational view of a bag having a first compartment for receiving the food items, a second compartment for receiving water expelled from the first compartment and ribbons formed at the top of the bag for increasing the radius of rotation of the device;

FIG. 3 is a perspective view of the device of FIG. 1; and

FIG. 4 is a fragmentary view of an alternative embodiment of the dewaterer of the present invention including a funnel shaped throat between the first compartment and the second compartment.

Corresponding reference characters indicate corresponding components throughout the several views of the drawings.

DESCRIPTION OF THE PREFERRED EMBODIMENTS

Referring now to FIGS. 1-3, a dewatering bag for use in the course of preparation of food items such as salad greens, is generally indicated by the reference numeral 20. The bag 20 is formed throughout from thinwalled sheet material, and includes a first compartment 22 for receiving the food items to be dewatered. The compartment 22 has an opening 24 at its top 26 for reception and removal of the food items. The first compartment 22 also includes a throat 28 adjacent its bottom 30 which is sized to pass water but is also sized substantially to prevent passage of the food items therethrough. A second compartment 32, extends beyond the bottom 30 of the first compartment. The second compartment 32 has a closed bottom 34 and encompasses the throat 28 so that liquid flowing from the first compartment 22 is collected in the second compartment.

More specifically, the dewatering bag 20 may be formed by a pair of thinwall plastic sheets 40 and 42, of material such as polyethylene or polyvinyl chloride, with the sheets welded (thermally or sonically) along their margins 39 and 41 to form a sleeve. Alternatively, an extruded tube of thinwall plastic may be used so that no marginal welding is required. The bottom 34 of the second compartment may also be formed by welding, and the coextensive bottom 30 of the first compartment and top 36 of the second compartment, as well as the throat 28, are formed by a discontinuous transverse weld 38. Preferably, this weld 38 is arcuate, having a discontinuity forming the throat 28 at the centerline of the bag.

Each of the aligned sheets 40 and 42, which are welded together along their margins to form the compartments, preferably has a "T" shaped cut 43 adjacent the top 26 of the form ribbons 44. It will be appreciated that these ribbons 44 not only form ears for holding the bag but also function as extensions to increase the radius of revolution of the bag thereby increasing centrifugal force on the water to cause it to flow from the food items located in the first compartment through the throat 28 and to be collected in the second compartment 32.

Operation of the dewatering bag 20 of the present invention is as follows: The washed food items such as salad greens are loaded into the first compartment 22 through the opening 24. The user then holds the bag by the ribbons 44 and revolves or twirls it. This causes the water from the food items to be forced through the throat into the second compartment where the water is collected. The food items then can be removed through the opening 24, and the dewatering bag 20, with the water held by the second compartment 32, can be discarded. Alternatively, the water held in the second compartment can be drained by cutting of the compartment, and the food items can then be enclosed in the first compartment by tying the ribbons together, and placed in a refrigerator for subsequent use.

Referring to FIG. 4, a portion of an alternative embodiment 20A of the dewatering bag of the present invention is shown. Components of the device 20A corresponding to those of the device 20 are indicated by the reference numeral assigned to the component of the device 20 with the addition of the suffix "A". In the dewatering bag 20A, the portion of the transverse weld 38A defining the throat 28A includes a pair of convergent legs 46 extending toward the bottom 34A of the second compartment 32A to form a funnel 48. This results in the formation of a pocket 50 on each side of the funnel 48. Inversion of the device 20A with water held in the second bag 32A causes water to enter the pockets 50 rather than to return to the first bag 22A via the throat 28A. Of course, the user can collapse the throat by pinching, completely isolating the compartments from each other.

It will also be appreciated that while the dewatering bag 20 is of unitary construction, a dewaterer incorporating the features of the present invention may also be formed by a pair of bags with one disposed inside of the other. The inner bag would be somewhat shorter and the tops of the two bags would be held together so that upon revolving the dewaterer, water from the first bag would exit through a throat at the bottom of the first bag and be collected in the outer, envelopment bag.

Besides home use, the dewaterer 20 of the present invention is also particularly well suited for use in commercial establishments, such as restaurant kitchens and gourmet restaurants. The dewatering device 20 can be employed to dewater large or small quantities or even individual servings of the food items on an ad hoc basis.

Other uses for the dewatering device of the present invention will also be found. For example, it if is desired to remove excess salad dressing from a salad, the salad greens can be placed in the first compartment, and the excess dressing removed as above described. In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A method for dewatering food items comprising the steps of:

placing the food items in a compartment formed from flexible thinwall sheet material, said compartment having an open top and an opening opposite the open top sized to permit passage of liquid but substantially to prevent passage of the food items therethrough; and twirling the compartment nearby its open top to cause water from the food items to be expelled through the opening by centrifugal force.

2. The method of claim 1 wherein water expelled through the opening is collected in a second compartment surrounding the opening.

* * * * *